April 9, 1935.  E. E. NOVOTNY  1,997,074
METHOD OF AND APPARATUS FOR MOLDING SYNTHETIC RESINOUS ARTICLES
Filed Jan. 24, 1930  8 Sheets-Sheet 2

INVENTOR.
EMIL E. NOVOTNY.
BY
Coonagh James
ATTORNEYS.

April 9, 1935.   E. E. NOVOTNY   1,997,074
METHOD OF AND APPARATUS FOR MOLDING SYNTHETIC RESINOUS ARTICLES
Filed Jan. 24, 1930   8 Sheets-Sheet 3

INVENTOR.
EMIL E. NOVOTNY
BY
ATTORNEYS.

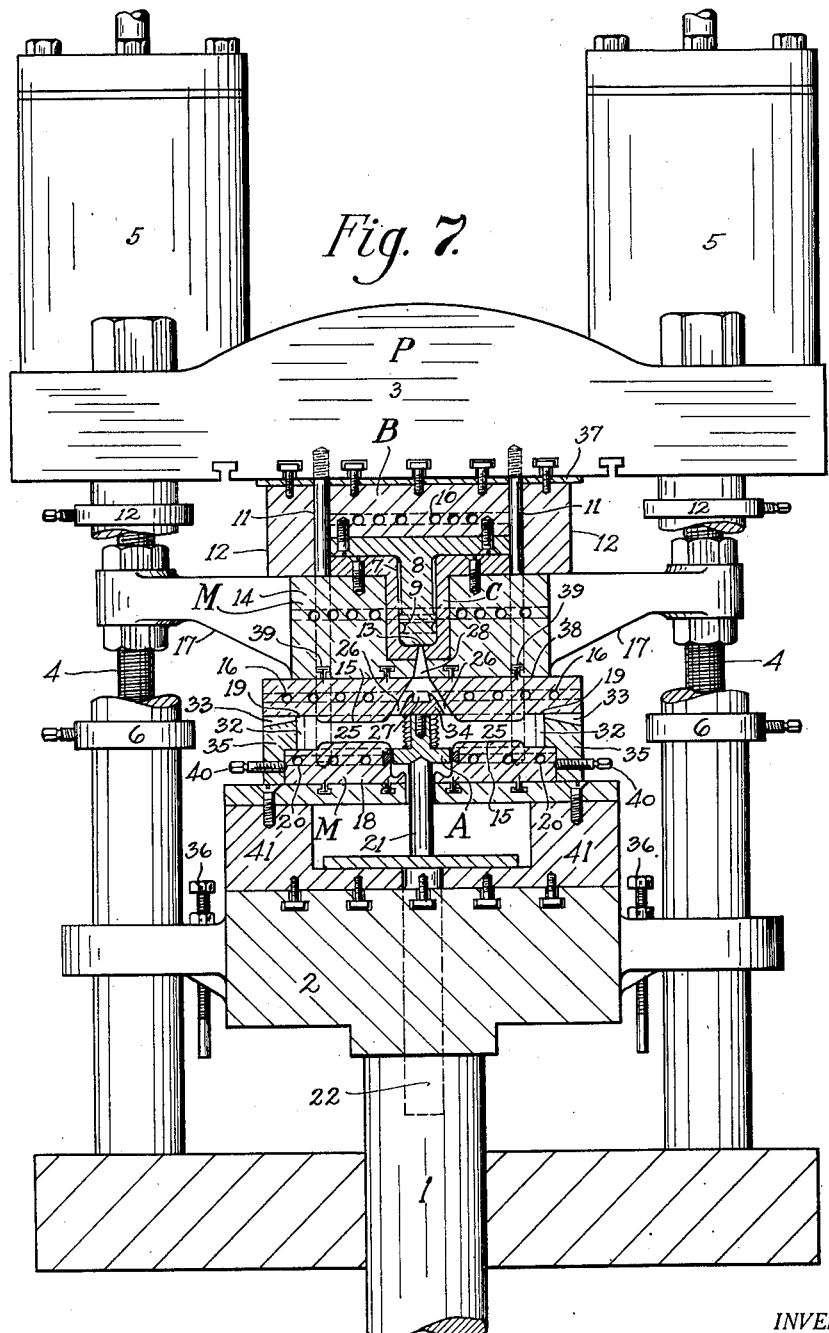

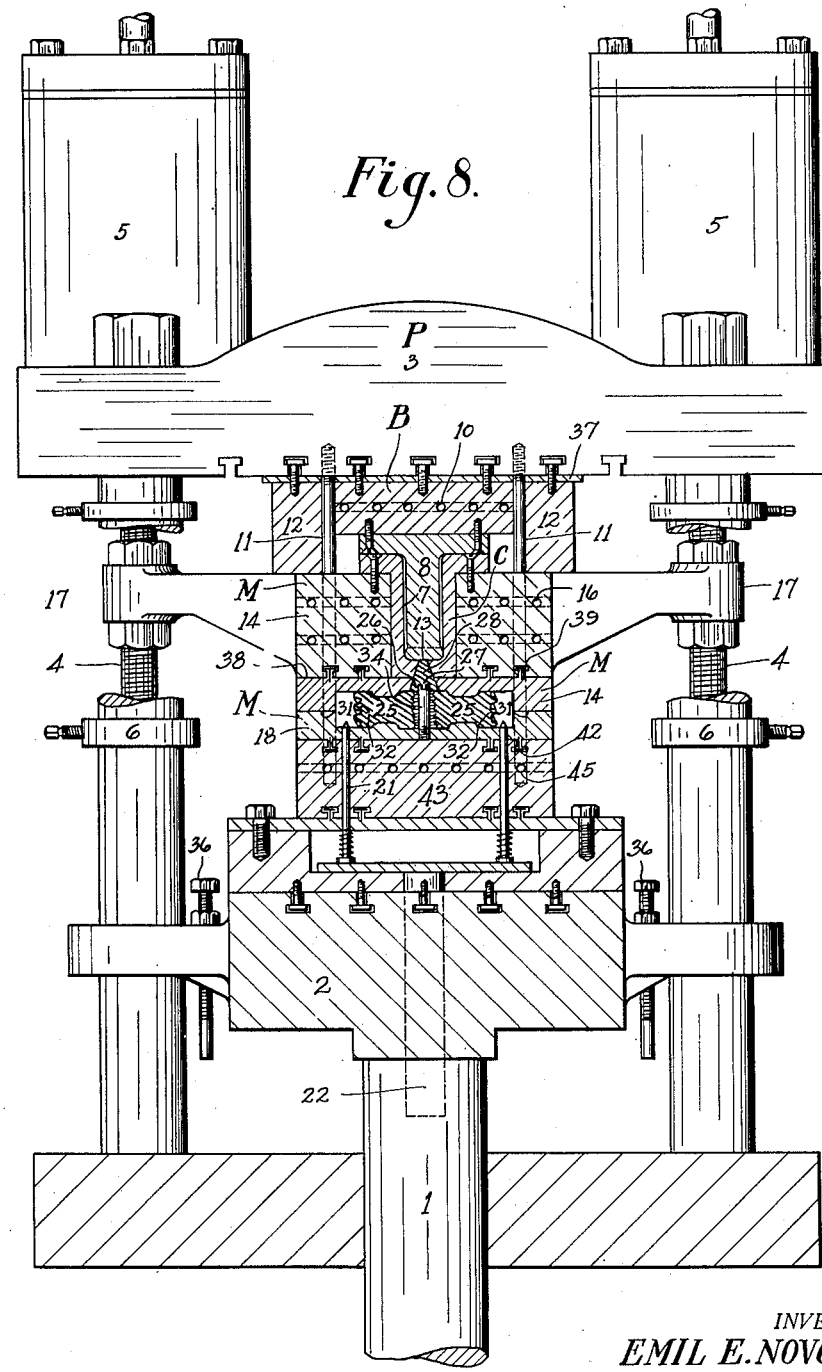

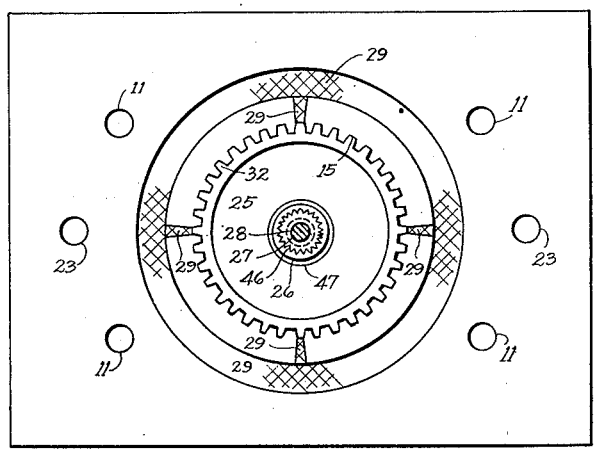
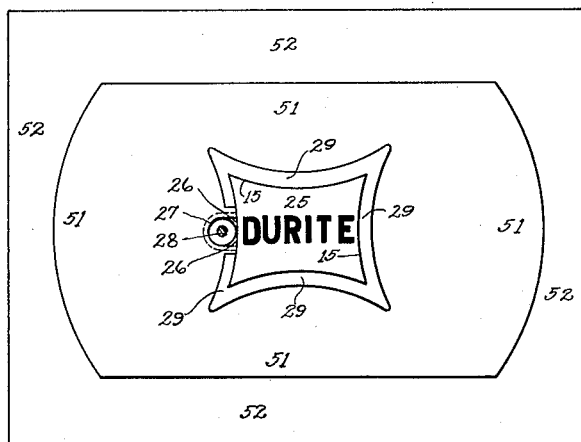
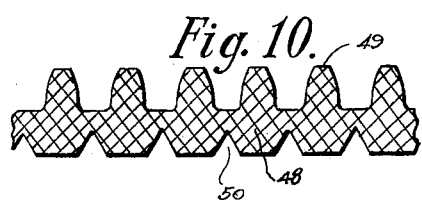
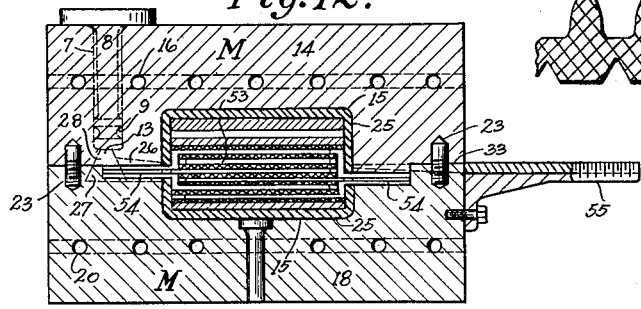

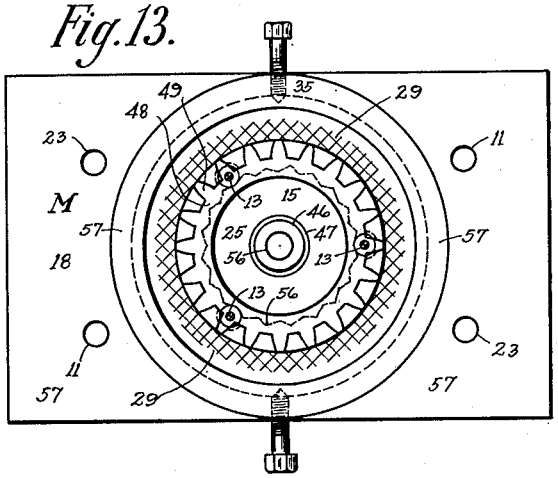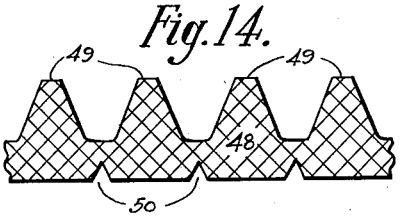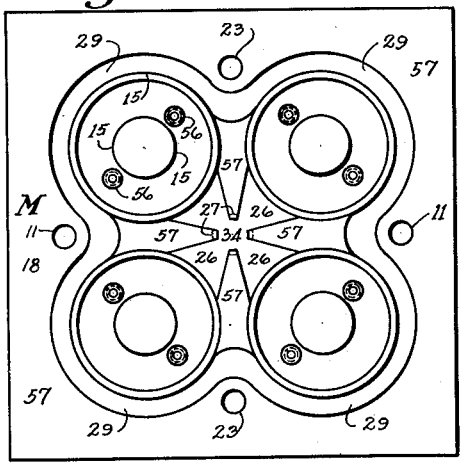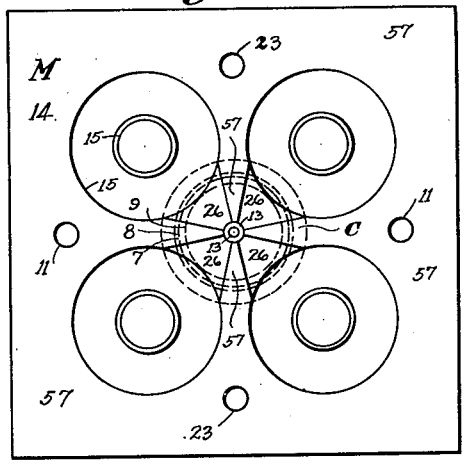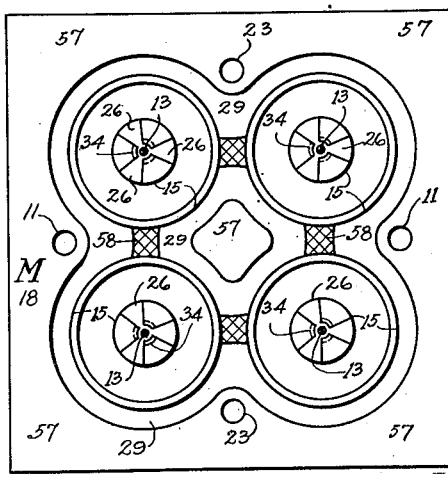

April 9, 1935.  E. E. NOVOTNY  1,997,074
METHOD OF AND APPARATUS FOR MOLDING SYNTHETIC RESINOUS ARTICLES
Filed Jan. 24, 1930  8 Sheets-Sheet 8

INVENTOR.
EMIL E. NOVOTNY.
BY
ATTORNEYS.

Patented Apr. 9, 1935

1,997,074

UNITED STATES PATENT OFFICE 1,997,074

METHOD OF AND APPARATUS FOR MOLDING SYNTHETIC RESINOUS ARTICLES

Emil E. Novotny, Philadelphia, Pa., assignor to John Stogdell Stokes, Spring Valley Farms, Huntingdon Valley, Pa.

Application January 24, 1930, Serial No. 423,160

35 Claims. (Cl. 18—17)

This invention relates to the molding of synthetic resinous materials, and more particularly to an improved method and apparatus for molding such materials.

The primary object of my invention is to provide a method and apparatus which will make molded synthetic resinous products exact in dimension; which will reduce mold costs both for construction and upkeep; and, most importantly, which will make it possible to mold relatively cheap synthetic resinous compositions of slow flow, and strong synthetic resinous compositions including various long fibers.

Further objects of my invention are to overcome the many disadvantages of conventional ways of molding synthetic resinous materials, as in a positive mold, an open or flash type mold, or by transfer molding as heretofore practiced. My present method is a form of transfer molding but, unlike prior transfer molding, I do not have to use a free-flowing plastic material with a high proportion of resin and a low proportion of filler. The free-flowing resin was heretofore essential to keep the operating pressure below, say 5,000 lbs. per square inch, for even that is high compared to the pressures ordinarily used for positive or flash type molds. Consequently, the composition used was usually two parts of synthetic resin of a very free-flowing type to one part of powdered filler, or various lubricants or/and solvents were used, but these reduced the mechanical strength of the product.

In accordance with the present invention, a cheap compound containing a high percentage of any desired filler is thoroughly mixed and compounded while made to freely flow through a small outlet under super pressures developed in an especially designed small-diameter high-pressure chamber. The mold and the press, however, are not constructed to withstand the super pressure, and instead the pressure in the mold is definitely limited or relieved. This release of pressure permits escape of excess material, and the absence of an equalizing back pressure in turn permits complete emptying of the pressure chamber, which in itself solves a serious problem in connection with infusibly setting resins, for otherwise it would be necessary to clean out residual reacted material from the pressure chamber after each stroke.

In developing this process I have discovered that it is a simple matter to obtain pressures of not less than 5,000 pounds to the square inch and up to 100,000 pounds to the square inch and higher by a very positive means, and that under pressures somewhat above 5,000 pounds to the square inch and certainly at pressures of 50,000 to 60,000 pounds to the square inch sluggish, slow flowing synthetic resinous materials may be made to flow rapidly and will to a great extent be self heating. At a pressure of 60,000 pounds to the square inch an ordinary synthetic resin composition consisting of equal parts of resin and wood flour heated to a temperature of say 350° F. will squirt through a pin hole for a distance of 50 feet. Under these conditions, materials most reluctant to flow may be readily forced through an orifice into a mold cavity and with the greatest of fidelity reproduce the exact luster and finish of the shape defined therein. As there is no pressure within the cavity until the cavity has been completely filled, there are no violent surges and mold costs can be maintained at a very low annual figure. There is, furthermore, no scoring and no radial abrasion such as occurs in molding with the old type of flash molds. Materials consisting of long, spinnable fibres such as canvas, as used for the production of laminated gears, or comminuted paper such as is used in the making of laminated sheet stock, will all be forced to flow and to mold and reproduce a most exact replica of the mold cavity. It is practically impossible to tell that shredded canvas had been the filler for the synthetic resin composition, this particularly being true in the case of black and brown colors. This is not only due to the exactitude with which the material is caused to fill the mold cavity but is also, to a great measure, due to the fact that at this high pressure there is practically no segregation of resin and filler, which is true in the usual type of molding now being done with comminuted canvas materials. It is also most likely that the heavy compression followed by release of pressure while the mold cavity is being filled causes the absorbent filler material to more thoroughly absorb any of the synthetic resin binder which may not be thoroughly combined therewith.

The precision and beauty of the parts molded from canvas and their great strength caused me to experiment further, which has led to the confirmation that merely a mixture of dry synthetic resinous material and a filler, would be impregnated and thoroughly bonded without the need for resorting to the process of impregnation of such products through the use of alcoholic or other solvents.

It is well known to those in the art, that it is extremely difficult to produce a thoroughly compounded synthetic resinous mixture of even finely divided wood flour and synthetic resin which will not show specking or uncovered wood flour. By my method I am able to take an ordinary composition which may be previously compounded or which may merely be mixed and placed into the pressure chamber, and through the use of extraordinarily high pressures in the pressure chamber I am enabled to not only mold with exactitude to the exact dimensions but also to thoroughly cover all of the filler particles so that the exterior molded surface will present an unbroken resinous skin high in dielectric strength and low in moisture absorption.

The use of these super-pressures which I believe a contribution to the art in itself, is not sufficient however to make such process commercially applicable for all types of molding inasmuch as the usual parts molded and the per diem production called for from a mold require that there be a considerable effective area at the parting line of the mold, and it is, therefore, apparent that a pressure of over 5000 pounds to the square inch applied to this large effective area would be tremendous indeed. With a mold full of cavities, as ordinarily practiced in the case of a flash type of mold, such pressure would be greater than the press would be capable of withstanding. The pressure in the mold may therefore be limited to a reduced value.

ating temperature, but due to the high velocity the product is capable of faithfully defining the contour of the mold cavity.

Actual operation seems to indicate that the polymerization of the product to its final set and ultimate form does not take place rapidly within the high pressure zone and this aids the operation of molding in permitting the heating of the product to a relatively high temperature. High velocity permits the use of high temperatures for the heating of the pressure chamber, the feeder channels, and for the mold cavity itself. I may also utilize a relatively low or ordinary operating temperature for the pressure chamber cavity, depending then upon the self heating of the product due to the super-pressures used. However, in actual practice it will be found that these molding devices may be heated to a very high temperature indeed, as the material does not remain in the pressure chamber cavity for more than a few seconds and the product is almost instantly transferred to the mold cavities, with the result that an unusually high per diem production from a mold is attainable.

The mold cavity does not require that the molding of these products be carried out at super-pressures and, as before stated, the mold assembly would be too monstrous, cumbersome and expensive if operated under these conditions. Instead, the mold cavity is filled at a velocity cavities, whereupon the mold cavities will instantly close so soon as the pressure, due to the elimination of excess material, is reduced to the desired maximum.

In converting the high pressure in the pressure chamber cavity to the low pressure desired, in the mold cavity or cavities, it is my desire to maintain these mold cavities in a substantially closed condition, clearly defining the entire outlines of the part or parts to be formed therein and to allow the mold cavities to open momentarily preferably only after the mold cavities have been completely filled and the product completely molded to the desired shape and form. This has not been practiced heretofore in molding with synthetic resinous products. So soon as the completely molded parts are formed and the pressure within the cavities rises to the maximum, the mold members part at the mold parting line and permit the material to flow into gouged out overflow channels purposely provided therefor, or the material may be permitted to flow through these channels entirely outside of the mold assembly.

This action of opening and closing the mold to reduce the pressure within the mold cavity, or cavities, and its feeder channels is ordinarily very rapid as preferably only a slight excess of material is placed into the pressure chamber cavity. The amount of material to be used is usually calculated empirically and depends upon the capacity of the feeder channels and cavities and upon the density of the product attainable with the pressure used and upon the particular synthetic resinous composition molded. It should, however, be understood that the basis of my method is to so regulate operating conditions through the placing of correct weight of material into the pressure chamber cavity at the outset or through the density or compression of the synthetic resinous material remaining within the cavity or cavities, feeder channels and gates as to provide the desired reduction in pressure. Stated otherwise, it is not essential that the molding operation be always dependent upon the opening of the mold to allow excess material to escape; but under certain conditions of operation it would be equivalent to predetermine and use the exact amount of material needed to fill with exactitude the gates, channels and cavities as to result in well molded strong parts with the pressure in the mold cavities reduced to safe operating limits. It is ordinarily difficult to predetermine and maintain with exactitude the charge of material placed in the pressure chamber cavity so as to always have the exact amount of compression within the mold cavities. On the other hand, where a variation in compression of the resinous mass is permissible, it is possible to reduce the high pressure generated in the pressure chamber to safe operating limits of pressure within the mold cavity or cavities by careful adjustment of materials placed in the pressure chamber cavity or by the volume of material forced from the pressure chamber cavity into the mold cavities. I prefer to use the overflow method but consider any other method of pressure reduction as equivalent.

I have found the use of opposed rams desirable in many cases, and these rams may, under ordinary conditions, be under constant pressure as by the admission of the usual hydraulic fluid such as water or oil or by the admission of air or other gaseous medium, preferably nitrogen fed through a suitable reducing valve adjustable to any desired pressure. These opposed rams, furthermore, enable the opening of the pressure chamber with rapidity despite the fit of the plunger within the chamber being quite close and offering considerable friction.

For certain purposes, the pressure within the gates, feeder channels and mold cavities may be balanced to a safe operating limit by providing suitable outlets preferably at a plane parallel with the mold parting line, such ports or outlets feeding into a gouged out channel either within the mold or to the outside of the same. If these channels so interconnect with the channels forming either the gate, the feed or the cavity, and if a predetermined rate of flow is maintained, the excess material and pressure will not be allowed to accumulate in the mold cavity. The material in the overflow channels may be readily removed when the mold members are opened at the mold parting line.

Reduction of friction is quite essential in my process, due to the high pressure used, and the pressure chamber cavity is provided with an outlet which becomes greater in the direction of flow of the synthetic resinous material from the pressure chamber cavity and I, likewise, provide wherever possible, feeder channels leading to the mold cavity, also preferably increasing in volume and preferably decreasing in cross sectional thickness at or near the junction of the feeder channels and the mold cavity or cavities.

The inward taper of the pressure chamber outlet eliminates the need for a restriction within this outlet inasmuch as this shape permits the removal of the tapered gate of synthetic resinous material formed therein when the mold is opened. As the pressure chamber cavity is, by my method, practically emptied at the end of each molding cycle, the removal of the gate with the molded piece removes substantially all of the surplus material from the apparatus.

The pressure chamber outlet should not either atomize the material or else spray the product over the mold parting line when the mold cavities are momentarily opened. With the outlet tapering inwardly, a reduction in pressure occurs at the outward point and this eliminates uncontrollable jets preventing the closure of the mold when opened.

It might be well to be more specific with regard to the size of pressure chamber outlet and the marked inward taper I recommend for use.

1. A pressure chamber cavity having an inside diameter of about 1½ inches and a stroke of approximately 2 inches would have an outlet at the inside of the chamber of approximately $\frac{1}{16}$ inch in diameter, a length of approximately ½ inch, with the outlet diameter about ⅛ inch at the outside of the pressure chamber cavity.

2. A pressure chamber cavity having an inside diameter of approximately 2 inches and a stroke of 2½ inches would have an outlet diameter of ⅛ inch and increasing gradually to ¼ inch if mold design required a relatively long outlet of say about 1½ inches.

3. The size of the pressure chamber, the pressure exerted therein, the velocity of the material while under pressure, the length of the outlet and the type of material used all require a certain amount of consideration to provide an outlet most suitable for the work in hand.

4. I have not found it necessary to always provide round outlets as other shapes can be used.

The feeder channels, interconnecting the pressure chamber outlet and the mold cavities, likewise, gradually spread out, but the spreading is more gradual except where such feeder channels are closely adjacent to the mold cavities as it is highly desirable that the thickness of these feeder channels in one dimension be materially reduced and that, if possible, at least the same volume of flow be maintained to eliminate back pressure. Specifically, the channel is preferably fanned out to be wide but thin, for subsequent easy breakage of the product from the gate.

The feeder channels are purposely arranged at the parting line of the mold to provide thereby a simple means for removing the synthetic resinous material molded therein. Although this material has been converted to an infusible product, it is formed into relatively thin, easily broken pieces which may be readily ground and remolded as described later.

With my method it is essential that the mold cavities be closed before any material is forced therein from the pressure chamber cavity, and, therefore, I have found it necessary to provide suitable bearers or stops, usually embodied in the design and shape of the mold itself, such stops being kept clear of all excess material and being permitted to close snugly at the parting line of the mold defining the cavities.

My process permits the use of various synthetic resin products and for that matter even initial unreacted resin forming mixtures may be utilized. Likewise, liquid and solid fused or fusible resins and in some instances even infusible modifications either alone or in admixture with other cementitious synthetic resins or binders may be used. The fillers also are diverse including those of an organic or inorganic nature, of a fibrous or non-fibrous nature, and a range including those of a lubricating nature on to those of an abrasive nature.

Various heat setting synthetic resins and admixtures may be used; that is, any of those at present known in the art; and while a resin having a definite fusible characteristic is to be preferred, I may utilize resins having no definite state of fusion but transformable almost directly from the liquid to the solid phase; that is, having no clearly defined stage of prolonged plasticity.

Where is it desirable to introduce into the pressure chamber cavity a mere mechanical mixture of synthetic resinous material and a filler, or to introduce therein synthetic resinous compounds which are incompletely mixed or processed, I find that such products will invariably mold the product to the shape desired but will, to an objectionable extent, show traces of uncovered filler as a result of the first portions of such composition forced through the pressure chamber outlet not having sufficient resistance to flow to permit proper impregnation during the mold cavity filling cycle. To prevent this, I find it most suitable to place at the very bottom of the pressure chamber cavity and preferably over the outlet a small quantity of processed composition which may be in powder, sheet or tablet form, and then complete the filling of the chamber with the balance of composition needed, which may or may not be previously compounded on differential rolls or otherwise impregnated.

Under the super-pressures I find desirable to use with my method there is a marked tendency for the synthetic resinous composition to find its way between the walls of the pressure chamber cavity and the curved faces of its plunger and, therefore, in some cases and certainly most particularly where my packing ring is not used, I find it advantageous to introduce the synthetic resin compositions or mixtures into the pressure chamber cavity preferably in a compressed or tablet form. These tablets can, advantageously, be preheated and if the preheating apparatus is arranged to coincide with the press operating cycle as by means of an automatic or other convenient filling device, such tablets may be preheated to relatively high temperatures. A preheated tablet assists in the shortening of the filling cycle. Under the high pressures I use, such preheated tablet material is forced into the mold cavities where such cavities are of ordinary size, in a matter of a few seconds. Where such preheated tablets are used and where the heating is done as by means of a hot plate, it will be found that by placing the face of the tablet which had been in close proximity to the heating surface in a position to face the operation of the pressure chamber plunger, that the tendency for the material to flow out past the plunger will be greatly eliminated while in no way affecting the finish of the molded parts. The molded parts are not specked by such materials even though overheated at the surface next to the face of the plunger, as the high pressures result in very thorough mixtures in the outlet and feeder channels, and because, also, as a rule, such material will be forced through the outlet at the very last and, therefore, remain in the feeder channels.

In the accompanying drawings—

Fig. 1 is a partly sectioned elevation of a suitable press equipped for molding synthetic resinous materials by my method.

Fig. 2 indicates the position of the apparatus after completion of the molding cycle.

Fig. 7 is a partly sectioned elevation of a hydraulic press equipped for the molding of a gear which may be made of either laminated or shredded canvas, or paper.

Fig. 8 is a view partly in elevation and partly in cross section of a hydraulic press equipped for the molding of gears by automatic operation.

Fig. 9 is a plan view of a mold showing a toothed gear molded therein and illustrating one method of reducing the pressure in the mold cavity.

Fig. 10 indicates a fragmentary segment of canvas or paper impregnated with synthetic resinous material and properly filling the portion of the mold forming the gear teeth.

Fig. 11 is a plan view of a relatively fragile low cost mold.

Fig. 12 is a cross sectional view through a mold and pressure chamber and plunger, the pressure chamber being formed integrally with the mold.

Fig. 13 is a plan view of a lower half of mold used with long fibred flow resistant materials.

Fig. 14 is a plan view of a fragmentary portion of a cut out strip of canvas or paper as used in the molding of gear as shown in Fig. 13.

Fig. 15 is a plan view of a lower half of mold illustrating principles of mold design for the production of discs, knobs, sound records, spools, etc.

Fig. 16 is a plan view of the upper half of mold as illustrated in Fig. 15.

Fig. 17 is a fragmentary diagonal cross section in elevation of mold members illustrated in Figures 15 and 16 and shows the pressure chamber in coacting relation therewith.

Fig. 18 is a plan view of a lower half of mold and its cavities illustrating the use of a separate pressure chamber for each molded part and the use of pressure equalizing channels therewith.

Figure 19:
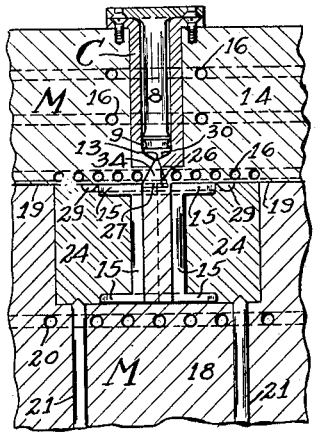

Fig. 19 is a fragmentary cross section in elevation of a typical mold assembly designed specifically for the production of a spool.

Figures 20, 21:
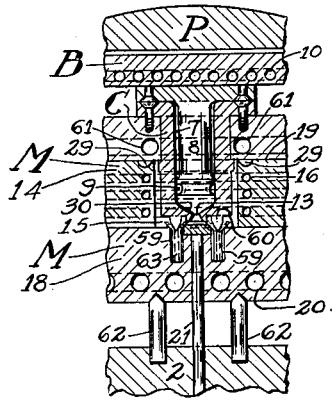

Fig. 20 is a fragmentary cross section in elevation of a hydraulic press (main ram not shown) illustrating the molding of radio vacuum tube bases.

Fig. 21 is a plan view in elevation of a socket pin insert used in molding tube bases as illustrated in Fig. 20.

Figure 22:
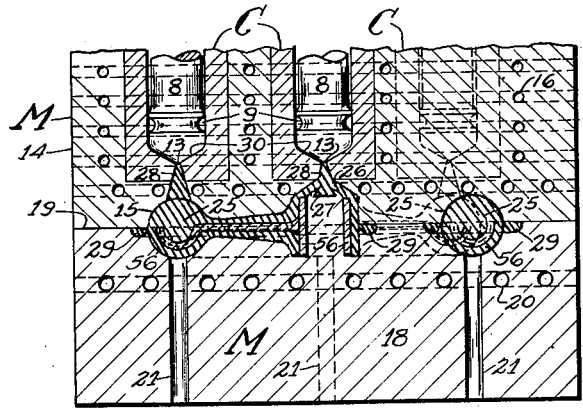

Fig. 22 is a fragmentary cross section in elevation of a mold and pressure chambers for molding an automobile steering wheel.

Figure 23:
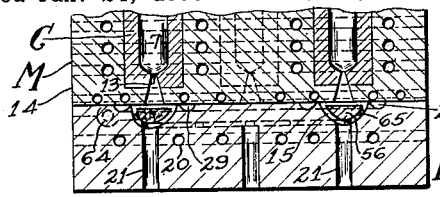

Fig. 23 is a fragmentary cross section in elevation of a mold assembly as used in the molding of large parts including the imbedding of large inserts and specifically shows a toilet seat mold cavity and method of supporting inserts therein.

Figure 24:
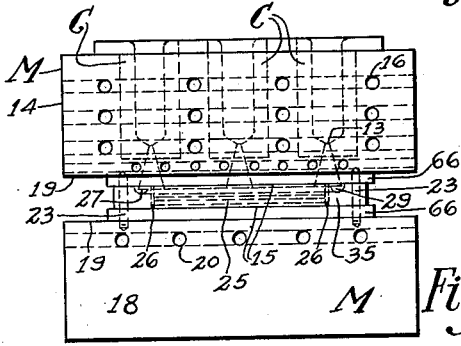

Fig. 24 is an elevation of a mold assembly and pressure chambers as used in molding laminated or sheet materials.

Figure 25:
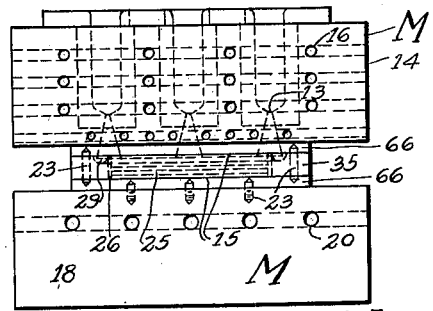

Fig. 25 is an elevation of a generally similar mold assembly and pressure chambers, but having a portable mold portion.

Figure 1:
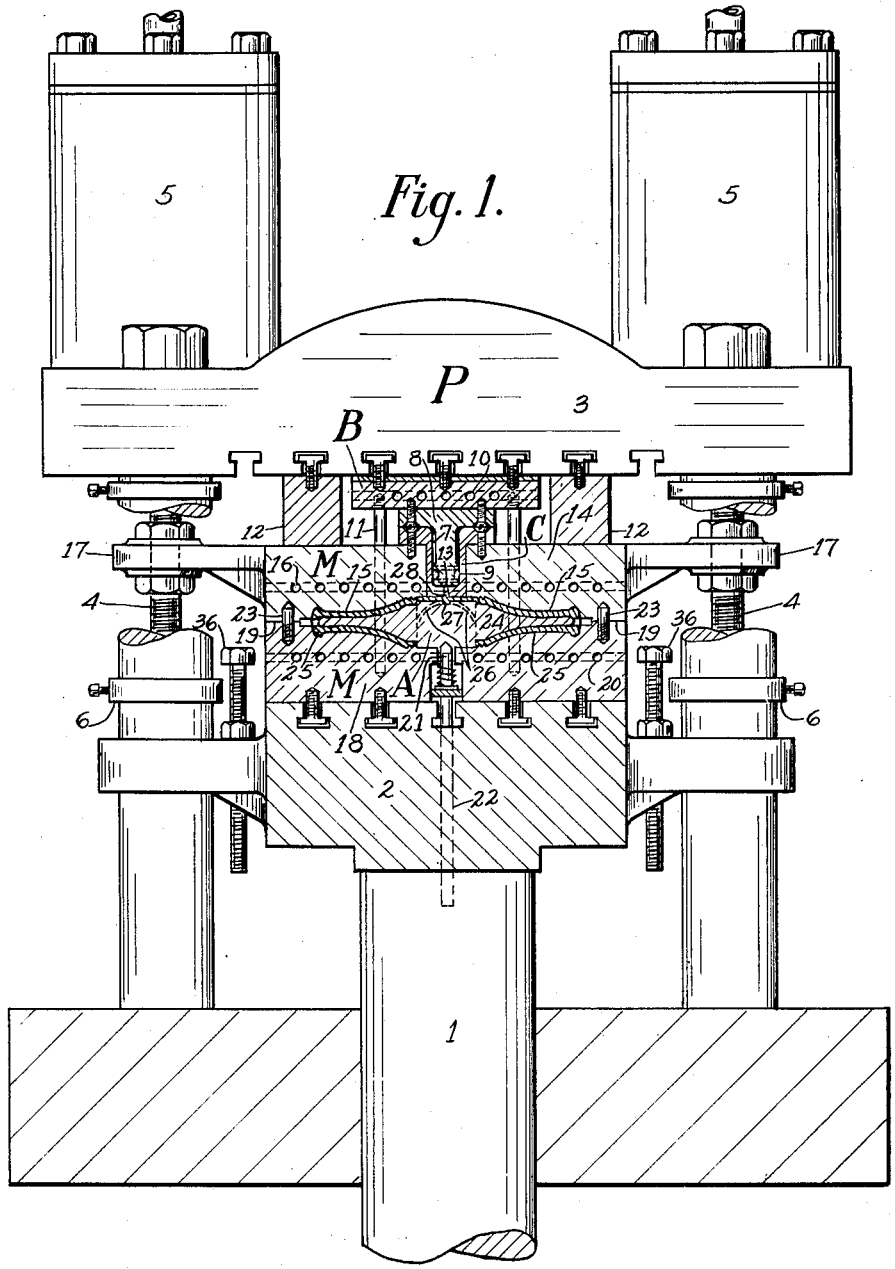

In Fig. 1 the hydraulic press in a closed position with the plastic resinous material undergoing cure is shown. The press as a whole is indicated by P, the mold assembly as a whole by M, the loose parts within the mold by A, the heated bed plate for pressure chamber by B, and the pressure chamber as a whole by C. The main ram is indicated as 1, the lower platen as 2, upper platen as 3, the opposed rams as 4, the cylinders for the opposed rams as 5, and the stroke limiting members for the opposed rams as 6. The pressure chamber cavity is shown as 7. The plastic synthetic resinous material had been forced therefrom by the action of the pressure chamber plunger 8, the material being prevented from escaping from pressure chamber 7 because of the pressure chamber plunger packing ring 9. The plunger is heated as conventionally shown at 10 and kept in proper alignment by means of aligning rods for pressure chamber and mold indicated at 11. As the pressure to the square inch applied to the effective area of pressure chamber plunger 8 is high, stroke limiting stops for pressure chamber as indicated at 12 prevent injury to the plunger 8 and the cavity 7. Pressure chamber outlet 13 has tapering walls to reduce friction and to permit the ready flow of material toward upper half of mold 14 and lower half of mold 18 which defines the mold cavities 15. The synthetic resinous material is indicated as filling such mold cavities and is being heat treated as conventionally shown at 16 and 20. The supporting brackets for pressure chamber C and upper half of mold 14 are indicated at 17, and the mold parting line at 19, and a suitable ejector for the finished product at 21 operated by the conventionally shown ejector bar 22. The mold is kept in alignment by means of mold aligning pins 23. The hollowed out portion of the molded telephone receiver shell 25 is formed by means of core member 24. Feeder channels for the synthetic resin are indicated at 26, and the undercut or roughened portion permitting synthetic resinous material to be removed from pressure chamber outlet 13 with the lowering of mold portion 18 is indicated at 27. The gate of synethetic resinous material formed in outlet 13 is indicated at 28.

Figure 2:
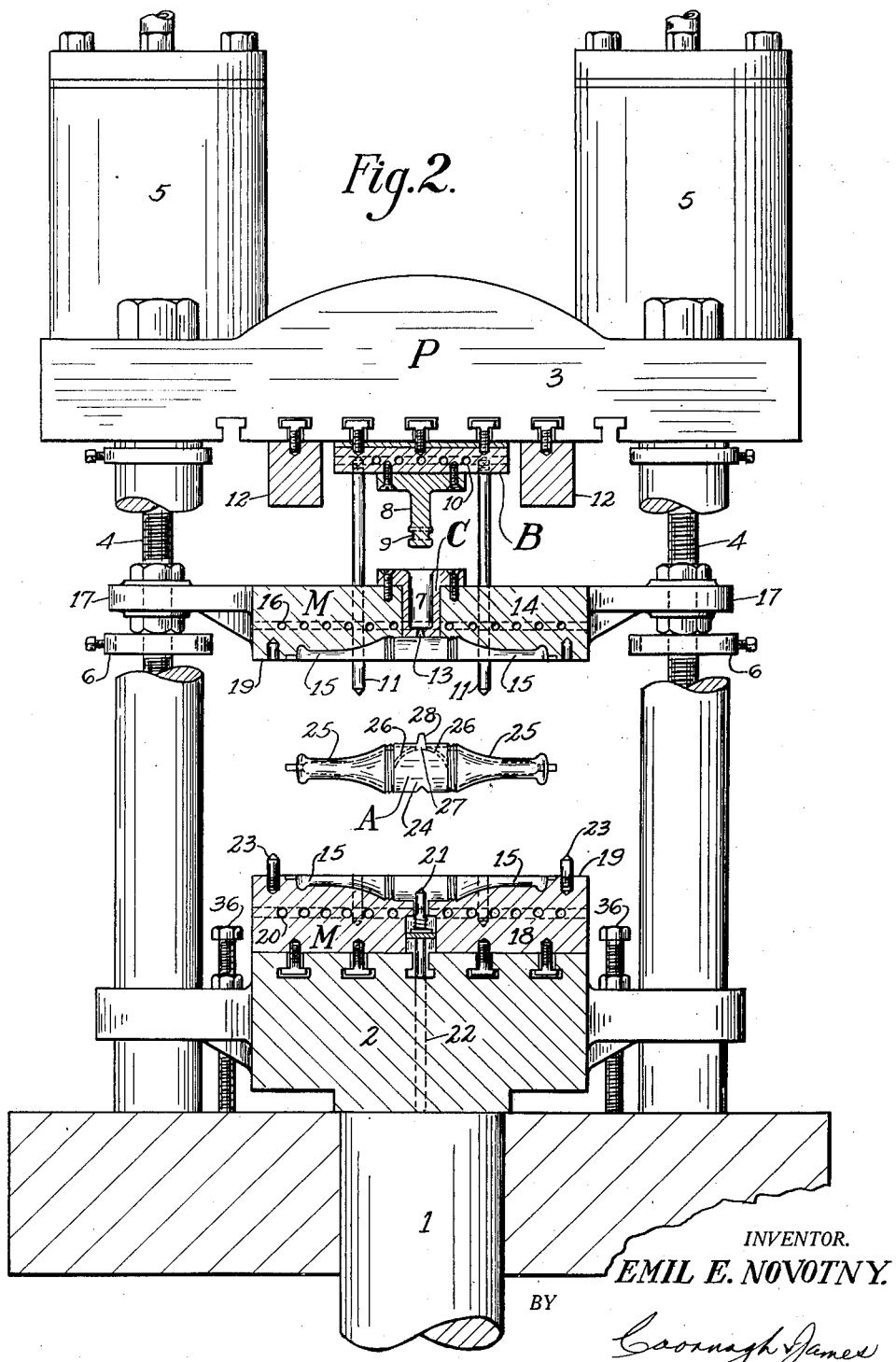

Fig. 2 shows the press P with main ram 1 lowered, opening up mold M and pressure chamber C, and showing loose parts of mold as indicated at A imbedded in the telephone receiver shells 25. The feeder channels for the synthetic resinous material are shown at 26 and the gate of synthetic resinous material formed in outlet 13 at 28. The drawings are really self explanatory although it might be stated that so soon as another loose part is positioned in the mold cavities 15 on pin 21 and an additional supply of synthetic resinous material is placed in pressure chamber cavity 7, the press may be closed and the cavity again quickly filled with the material forced through pressure chamber outlet 13.

Figure 3:
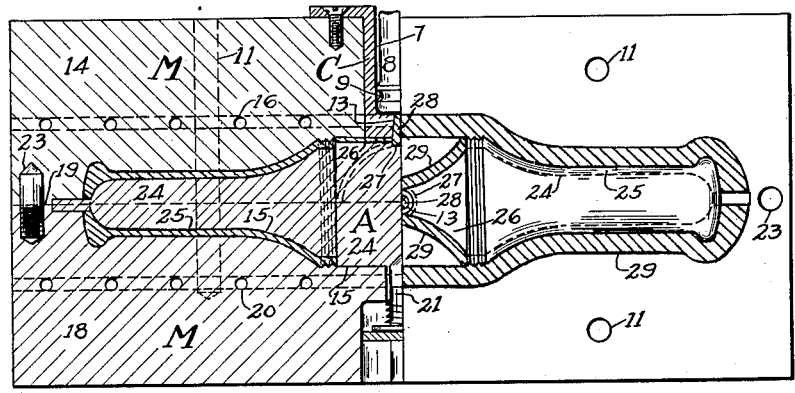
Fig. 3 is a detail of the mold cavities partly in cross section and partly in plan.

Fig. 3 shows further details of the mold M and the cooperating relation of pressure chamber C therewith. As all parts are similarly numbered, it would be superfluous to again point these out. It is of interest to note the relation of pressure chamber outlet 13 and its shape resulting in the formation of gate 28 which is held on core member 24 by means of the exaggerated indication of the undercut or roughened portion 27 which permits synthetic resinous material to adhere slightly. Note the gradual widening out of the feeder channels 26 becoming thinner at the line of demarcation of the molded part 25. This view also shows gouged or hollowed out portions 29 closely adjacent to the outside edges of the mold cavities 15. Mold cavities 15 are not maintained in a normally closed position and are caused to momentarily open, due to difference in hydrostatic pressure and pressure resistance, and to immediately close and to cut off cleanly and accurately providing a clearly defined part 25 and a clearly defined and cut off surplus 29 with the pressure chamber cavity 7 substantially clean of material. The packing ring 9 is clearly shown here and provides reasonable dimensional clearance between cavity and plunger while maintaining a substantially closed point of contact.

Figure 4:
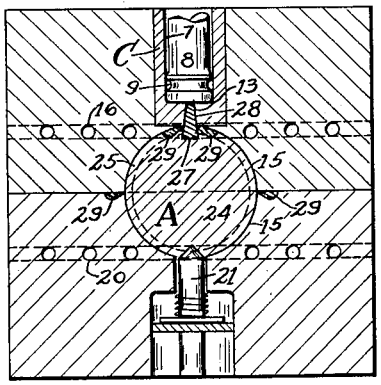
Fig. 4 is a fragmentary cross section of the mold cavity while the press is closed.

Fig. 4 shows a cross section through the mold M while main ram 1 is in elevated position. This view clearly indicates the overflow channels 29, the normally closed mold cavity 15, and the completely formed molded part 25. The maintaining of mold cavity 15 in a closed position makes possible the molding of threads on the receiver shells without the use of a loose thread forming ring.

Figure 5:
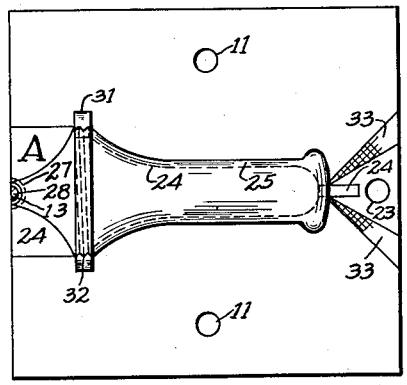
Fig. 5 is a modified plan drawing of the lower half of mold cavity showing the use of removable thread rings and an alternate method for balancing the pressure within the mold cavity.

Fig. 5 illustrates the use of a loose threaded ring indicated at 31, the threaded portion indicated at 32, and an alternate method for the elimination of excess pressure and material as by overflow channels 33 which lead the excess synthetic resinous material from the mold M. It is highly desirable that these overflow channels be formed at the effective mold parting line as indicated at 19 so the opening of the mold cavity 15 at the mold parting line 19 will also open overflow channels 33.

Figure 6:
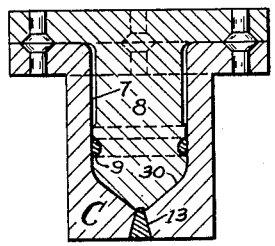
Fig. 6 is a cross sectional view of a modified form of pressure chamber and plunger therefor.

Fig. 6 shows a modified form of pressure chamber C wherein the pressure chamber cavity is indicated at 7, the pressure chamber plunger at 8, and the pressure chamber plunger packing ring at 9. The mating angular faces of the pressure chamber cavity 7, and of the pressure chamber plunger 8 are indicated at 30, and tend to decrease friction in the plastic synthetic resinous material in the direction of the outlet 13. Although the pressure chamber plunger packing ring 9 is highly desirable in many cases, it is to be understood that this packing ring may be eliminated.

Fig. 7 illustrates a suitable hydraulic press P, mold assembly as a whole M, pressure chamber as a whole C, heated bed plate for pressure chamber B, and loose parts within mold as indicated at A; main ram 1, lower platen 2, upper platen 3, opposed rams 4, cylinders for opposed rams 5, stroke limiting members for opposed rams 6, pressure chamber cavity 7 into which had been placed suitable synthetic resinous material, including as a filler comminuted shredded or cut canvas, paper, or other long fibres such as from waste wood, corn cobs, stalks, bagasse, oat or rice hulls, peanut shells, etc. These fibres may be treated with the synthetic resinous material prior to being placed in the pressure chamber cavity or else may be mixed or partly compounded with the resinous body in which case the final compounding takes place in the pressure chamber outlet and feeder channels. It may be any mixture comprising a suitable synthetic resinous compound useful for my purpose. Under the high pressure exerted by pressure chamber plunger 8 and retained by pressure chamber plunger packing ring 9 and heated as conventionally shown at 10 and aligned in proper coincidence by means of aligning rods for pressure chamber and mold as at 11 with the stroke limited by stroke limiting stops for pressure chamber as at 12, the synthetic resinous material is forced under extremely high pressure through pressure chamber outlet 13 into lower portion of upper half of mold 14 defining mold cavities 15. The upper half of mold is heated as conventionally shown at 16 and is supported by brackets 17 and properly aligned with lower half of mold 18, with a mold parting line at 19. The lower half of mold is heated as conventionally shown at 20, and provided with ejector 21 and ejector operating bar 22. Feeder channels for synthetic resinous material are shown at 26, and the undercut or roughened portion at 27. The formed gate of synthetic resinous material in outlet 13 is shown at 28. The article being molded is a gear, and its toothed portion is shown at 32 while the restricted overflow channels for synthetic resinous material open to the atmosphere are indicated at 33. A gate spreading member is provided at 34, chase at 35, stroke limiting member for main ram at 36, and heat insulation for upper platen 3 at 37. The junction of upper half of mold members is indicated at 38, and a method of fastening at junction 38 is indicated at 39. A means for fastening chase 35 to lower half of mold 18 is indicated at 40, and a spacing frame is shown at 41.

Fig. 8 illustrates a construction quite similar to that described in detail under Fig. 7. The press automatically ejects the gear from the mold without removal of the mold from the press. The purpose is to produce products of laminated paper or cloth or shredded or comminuted products of paper or cloth or other long fibres where great strength and rigidity are needed, and specifically shows the production of a composite molded gear. The pressure chamber C illustrates the use of a different type of pressure chamber plunger at 8 in that no plunger packing ring is provided. Here again the filler will mold without segregation from the resinous bond because of being forced under extremely high hydrostatic pressure through narrow channels. It will be found, and most particularly in the dark colors, extremely difficult to find the line of demarcation between the particles of say, shredded canvas material and the resin, as the product will have a smoothness of finish equivalent to the finish obtained through the use of ordinary wood flour mixtures. Of course, if great care is not used in thinning down the feeder channel for the synthetic resinous material as indicated at 26, the broken surface at such point, if of large area, may indicate the presence of long fibred materials. In this figure I illustrate a loose toothed ring 31 forming the toothed portion 32.

Fig. 9 is a plan view detail of the mold illustrated in Fig. 7 to better illustrate the method used in distributing the plastic synthetic resinous material entering the mold cavity 15 to form the molded part, which in this case is a gear as illustrated at 25. The material enters the mold cavity by the aid of the gate of synthetic resinous material as at 28. The use of the undercut or roughened portion illustrated at 27 is optional inasmuch as in this case the molded part 25 is sufficiently large to stay within the lower mold portion and assure the removal of gate 28 from outlet 13 whether an undercut portion 27 is used or not. The toothed portion of the gear is indicated at 32, and may be formed of either comminuted or shredded canvas or paper product, or by placing therein continuous spiral-like layers of previously shaped impregnated or unimpregnated canvas or paper, a fragment of which is illustrated in Fig. 10. It should also be understood that it is possible to mold gear blanks without teeth for the purpose of providing the trade with shaped blanks which may subsequently be cut to form teeth. The overflow channels 29 are so designed as to provide just the right amount of back pressure needed in cavity 15 and to enable the use of super-pressures in pressure chamber C. While I have preferably shown a mold structure wherein the reduction in pressure in the mold cavity takes place in channels within the mold itself, it is to be understood that channels of the type illustrated in Fig. 5 at 33 and which are open to the atmosphere may likewise be used. I may also utilize the cut-off type of overflow channels, in which case the mold is momentarily allowed to open to permit the elimination of excess pressure and material as illustrated in Figures 1, 2 and 3.

Fig. 10 is a plan view of a portion of tapelike material of canvas or paper and which may be impregnated or not, the body of which is indicated at 48 and has tooth-forming portions indicated at 49 and notches or inverted V portions indicated at 50. This tapelike material may be cut out to the size and shape required for various types of gears and may be placed into mold cavity 15 either in segments or as a built up continuous laminated layer. The cut-out portions may be used for molding of other portions or parts. If strip 48 is not impregnated a relatively rich synthetic resinous compound is used in pressure chamber cavity 7, or at other times a pure synthetic resinous material free from fillers is forced out of the pressure chamber into mold cavity 15, this impregnating fibrous material 48 and simultaneously forming the shaped body. The gear hub is indicated at 46, (see Fig. 9) and is only conventionally shown, and may be of any desired shape, and may be increased to include the entire web of the gear. In this case only the toothed portion 32 would be of composition and the balance of the wheel of other material. The fillet of the hub is indicated at 47.

Fig. 11 shows an interesting form of mold wherein such mold is of a composite nature consisting of a relatively weak material as indicated at 51, defining the mold cavity 15 forming the molded part 25, illustrating in this case a printing or name plate but which might be any desired dental, electrical or mechanical article. This mold forming portion 51 may be made of a soft metal, or of plaster of Paris, Portland cement or other cementitious materials such as synthetic resinous products and may have a plated surface coating or may be sprayed or otherwise surfaced with a non-adhesive coating such as cellulose acetate, or graphite, etc. This mold portion 51 has formed therein overflow channels indicated at 29, but such overflow channels may be of the type 33 illustrated in Fig. 5 which, in the latter case, will reduce pressure in the mold cavity without movement of the mold sections. The use of overflow channels is essential to the proper functioning of my process. At 26 I have illustrated the feeder channels leading into mold cavity 15, while at 27 an undercut or roughened portion is indicated which is useful in many cases but which may be eliminated in others. At 28 the gate of synthetic resinous material formed in outlet 13 of pressure chamber C (illustrated in other figures) is shown. At 52 a support member is used and can be considered as a chase or armor for the mold and consists of relatively strong material such as hardened tool steel. This member 52 has great tensile and compression strength and will support and maintain in position the weak, fragile cavity forming material indicated at 51. Where only a limited number of pieces are required or where the original matter is of such a nature that a cast or reproduction must be made therefrom under relatively low pressure as by the use of cements, plastics, or sprayed metals, as in the reproduction of lace, leaves, flowers, the grain of wood, leather, type metal, etc., this method is quite desirable. By properly proportioning the pressures generated, or by properly proportioning the overflow channel of the type 33 in Fig. 5, it is possible to force material within the mold cavity 15 at a relatively high velocity, but to have the pressure within mold cavity 15 of only a few hundred pounds to the square inch if so desired. I have found, for example, that it is possible to form in a dentist's mold made of cement-like material including set in portions of metal or porcelain, synthetic resinous materials containing high proportions of fillers and, if desired, utilizing shredded or cut canvas or paper if great flexibility and shock resistance are needed. The reproduction of the cavity obtained in this relatively fragile and cheap mold is perfect, as is required by the dental art. For some purposes if but one cast is needed, as for dental work, for example, bridges and false teeth, it is not necessary that the mold consist of two parts, as the fragile parts of the mold can be broken for the removal of the molded part. The overflow channels would, in this case, be open to the atmosphere as indicated at 33 in Fig. 5. Under these conditions, by regulating the pressure and velocity, the material may be molded at a high pressure to obtain flow and with a very low pressure in the mold cavity, say, only 100 pounds per square inch. It is desirable that the chase as indicated by 52 be used to support and strengthen the weak, fragile member 51. In the case of dental work, the chase 52 need consist of only one part if material 51 is subsequently to be broken out when the molded part 25 is removed therefrom.

Fig. 12 illustrates the molding of a synthetic resinous shroud or cover over an electrical condenser to seal the condenser assembly from the atmosphere. In this case, the pressure chamber C is unitary with the upper half 14 of mold M and consists of pressure chamber cavity 7, pressure chamber plunger 8, pressure chamber plunger packing ring 9, heating arrangements conventionally shown at 16 and 20, lower mold section 18, mold aligning pins 23, mold cavity 15, molded part 25, pressure chamber outlet 13, feeder channel for synthetic resinous material 26, an undercut or roughened portion permitting synthetic resinous material to adhere slightly, if desired, as shown at 27, gate of synthetic resinous material formed in outlet 13 as shown at 28, overflow channel for synthetic resinous material open to the atmosphere as indicated at 33. The condenser assembly is shown at 53, the condenser lugs conventionally indicated at 54 and an overflow measuring device indicated at 55. With a given weight of material of known density, placed in pressure chamber cavity 7 and with the pressure chamber plunger 8 traveling at a predetermined rate of speed, the material entering mold cavity 15 as at 26 will not attain any pressure until cavity 15 is completely filled, including a certain portion of cavity 33 which is open to the atmosphere. By maintaining a rate and a volume of flow, as is made possible by the overflow measuring device 55, conventionally indicated, it is possible to observe and measure the excess material, and to obtain compression of the condenser assembly within very close limits, resulting in a definite capacity in microfarads. It is to be understood that in this case it is quite essential that an individual pressure chamber cavity and plunger be provided for each mold cavity. The pressure chamber plunger packing ring 9, while not absolutely essential, is highly desirable inasmuch as it more definitely assures the forcing of a uniform amount of synthetic resinous material through pressure chamber outlet 13 and into mold cavity 15.

Fig. 13, showing a plan view of the lower half of mold section indicated by M and 18, admirably illustrates the convenience of utilizing a number of small size pressure chambers (not shown), their location being indicated by the three pressure chamber outlets 13, the inner circle representing the diameter at the inside of the pressure chamber cavity while the outer circle shows the opening at the outside of the outlet. The usual aligning rods for pressure chamber are conventionally indicated at 11 whereas the mold aligning pins are conventionally show at 23. The mold cavity (only one being illustrated in this case) is shown as an entirety at 15, forming the molded part 25 which is illustrated as a gear having a large imbedded insert 56. This gear has a hub at 46 and a fillet at 47. The overflow for material is indicated at 29 and the mold bearers at the parting line are indicated at 57. As before, the mold cavity may be filled with a suitable synthetic resinous compound including cut or shredded long fibred materials such as canvas or paper, or the pressure chamber cavity may be merely charged with a more or less pure synthetic resin.

In some cases a strip of canvas or paper (shown in Fig. 14) may be inserted in mold cavity 15 as indicated at 48.

The strip 48 may be any sort of sheetlike body, and may have any suitable punching or shaping, and may be impregnated or not as the particular nature of the work requires. If unimpregnated, my process will impregnate simultaneously with the formative operation. If impregnated, my method will form and bind to the desired shape.

Fig. 15 is a plan view of a lower half of mold which clearly illustrates my principles of mold design and operation for the production of various articles such as discs, knobs, sound records, spools, etc. This view, together with related views of the same apparatus shown in Figures 16 and 17, very clearly illustrates the molding principles which I claim as novel and which have proven in actual commercial production to provide strong, uniform products with little or no defectives and at a high rate of production. In Figure 15 there is indicated the lower half 18 of the mold M, aligning rods for pressure chamber and mold at 11, mold aligning pins at 23, and mold cavities at 15. The molded part is not illustrated but the insert to be imbedded therewith is indicated at 56. The undercut or roughened portion permitting synthetic resinous materials to adhere slightly to the lower portion of mold member is indicated at 27. The gate spreading member is shown at 34 and feeder channels for synthetic resinous material at 26. Mold cavity bearers are shown at 57, and the overflow is indicated at 29.

Fig. 16 is a plan view of the upper half of the same mold, and shows how one pressure chamber feeds the four mold cavities, and most particularly brings out the relationship of the pressure chamber C and its outlet 13 with respect to the feeder channels 26. The mold bearers permitting the mold cavity to close tightly at the mold parting lines 15 are indicated at 57.

Fig. 17 illustrates the same mold and pressure chamber in vertical section. Corresponding numbers are used throughout and, therefore, detailed explanation will be avoided. The angular formation at 30 is optional but reduces friction quite materially and is most useful where long fibred products such as cut or shredded canvas or paper fillers are to be used in molding. The reduction in friction beyond the pressure chamber in the direction of mold cavities 15 is quite clearly apparent when we view the shape of pressure chamber outlet 13, gate spreading member 34, and feeder channels for synthetic resinous material 26. These feeder channels 26 also clearly illustrate thin cross section at the point of junction with mold cavity 15. Mold parting line appears at 19 while the overflow channels for synthetic resin are indicated at 29. For some purposes I may find it desirable to use overflow channels of the type 33 in Fig. 5. At 56 is shown the insert which is to be imbedded, but in order not to confuse the drawings, the molding material itself is not shown.

Fig. 18 shows the simplicity of providing pressure chambers at any point in a mold arrangement. In this case four pressure chambers are used for a four cavity mold, with the result that the pressure within the pressure chamber cavity is roughly stepped up to about ten times the pressure which would be available under old molding methods in a flash mold. Outside of the use of several pressure chambers, it would be of interest to call attention to channels for pressure equalization indicated at 58. With these pressure equalizing channels the pressure accumulated in more than one pressure chamber is equalized inasmuch as the cavities are interconnected, resulting in intercommunication between the pressure chambers themselves. Under ordinary conditions overflow channels 29 are sufficient to take care of pressure equalization. On the other hand, where a relatively long fibred material is used and extremely high pressures are resorted to, it is often desirable to equalize mold cavity pressures through the use of channels similar to those shown at 58, to prevent injury to an individual mold cavity due to excessive pressure being stored therein prior to the development of pressure in other cavities. This arrangement applies most particularly in cases where a large multiplicity of cavities are to form a single mold unit. At 57 the mold cavity bearers again appear. In this figure I have most clearly brought out the reduction in friction in the pressure chamber outlet as indicated at 13 feeding into the short and widening feeder channels 26 which are connected as thin cross sectional members to mold cavities 15. It might be well to mention here that there is a slight opening in mold cavity 15 at the point of junction with feeder channels 26, but it is to be understood that this does not constitute an open mold cavity inasmuch as pressure chamber outlet 13 is always closed by a gate of synthetic resinous material formed therein and, furthermore, such synthetic resinous material also fills feeder channels 26.

Fig. 19 is a fragmentary cross section in elevation of a mold assembly designed specifically for the production of a spool-like body. This arrangement again emphasizes most particularly the convenience of placement of pressure chamber C and outlet 13 with respect to mold cavity 15. It also shows the elimination of long feeder channels 26 and illustrates very nicely the full height cut-off at the demarcation of cavity 15 leading to overflow channels for synthetic resinous material as at 29. Note the simplicity of mold construction permitting the cavity 15 to form the spool heads in a horizontal position as there is no question of feeding material down the flange portion of cavity 15 because of the high pressure used in pressure chamber C and therefore the high velocity attained in the material. The width of spool flanges in cavity 15 at the mold parting line 19 will quickly balance out any excess pressure in the synthetic resinous material being forced into cavity 15 because of the relatively small diameter of pressure chamber plunger 8 with respect to the relatively large diameter of the upper face of flange in cavity 15 exerting an outward pressure against mold parting line 19.

Fig. 20 illustrates the molding of radio vacuum tube sockets, and shows a fragmentary view of a hydraulic press (like that of Figures 1 and 2) indicated as an entirety by the letter P, the heated bed plate for pressure chamber at B, the pressure chamber as a whole at C, the mold assembly as a whole at M. A conventionally shown heating arrangement for the bed plate is indicated at 10. The pressure chamber cavity again appears at 7, the pressure chamber plunger at 8, the packing ring at 9, and as I have in this case found it most useful to use a conical shaped plunger head I have indicated the cooperating angles within the bottom of pressure chamber C at 30. The small size of pressure chamber C permits me to utilize the exterior of such pressure chamber as a core or plug for the formation of the hollowed out portion of mold cavity 15. The small size of this plunger carries the outlet 13 very close to the mold cavity 15 and provides a step up in pressure of about 7 to 1. I am thus enabled to provide mold M with a multiplicity of cavities 15 and to use a relatively slow flowing synthetic resinous material high in fillers in pressure chamber cavity 7. The use of a high filler content provides a product having great shock, heat and electrical resistance and, at the same time, makes branding of the trade mark and type numbers of the tube a simple matter indeed. As these tube bases are fastened to the glass or bulb part of the vacuum tube by means of a cement requiring high temperatures for its rapid setting, the use of a high filler content reduces thermoplasticity of the synthetic resinous molded part and makes such part less liable to blister. The overflow channels for synthetic resinous material indicated at 29 provide a normally closed mold cavity 15, therefore eliminating the need for a grinding and finishing operation of the molded tube bases as there will be no fins or overflow as through the use of an open mold cavity as at present practiced. The imbedded inserts, which in this case are socket pins and are indicated at 59, can be ordinarily open tubular members of either a rolled or drawn type, considerably cheaper than the special socket pins at present in use. As the mold cavity 15 is closed before any material enters through pressure chamber outlet 13, the spreader and seal indicated at 60 spreads out the socket pins so they will readily mold into the plastic material and at the same time prevents any synthetic resinous material to flow down into the inner passage or hole in socket pins indicated at 63. On account of the formation of pressure chamber C, a supplementary heating arrangement is provided as conventionally shown at 61. This heating arrangement for the pressure chamber being separate from the heating arrangement for the upper half of mold member 14, it is possible to heat the pressure chamber at either a higher or lower temperature than the mold M. The lower half of mold M, indicated as 18, is made to interchange slidably with another such portion and in use such lower mold members 18 are alternately brought into position by means of the mold aligning slide rails indicated at 62. By this method I am enabled to provide one lower half with socket pins 59 while another is in position under upper mold member 14.

Fig. 21 shows the type of socket pins I prefer using, the pin as a whole being indicated as at 59 and the hole for receiving the terminal wires being indicated at 63. It will be noted that there is no head provided for this pin and that it is not necessary to use a spun-over or closed head to close hole 63 inasmuch as the spreader and seal indicated in Fig. 20 at 60 takes care of this operation during the act of molding such parts.

Fig. 22 shows the method I prefer to use for the production of relatively large objects such as furniture, pulleys, hand wheels, etc. This illustration specifically shows the formation of an automobile steering wheel. It will be noted that the plural pressure chambers C are interconnected with one mold cavity illustrated again at 15, forming the molded part 25, the molded part having an imbedded insert previously placed in mold cavity 15 and which is indicated at 56. The imbedded insert in this case is shown as consisting of stamped out metal, but it is to be understood that most any suitable insert can be used such as, for example, rope, tubular fabric, wound paper, etc. If such imbedded insert 56 is not self supporting so far as its position is concerned in mold cavity 15 as, for example, if rope were used as an insert, such insert is suitably spaced out by means of chaplets of any material but preferably using properly shaped preformed tablets of the same composition as is to be used in molding the balance of the part. The use of such chaplets is illustrated in Fig. 23 at 65. By being able to mold a product high in filler content and utilizing strong, long fibred materials such as cut or shredded canvas or paper, and to be able to mold these at a predetermined density within mold cavity 15, I am enabled to control shrinkage and warpage within molded part 25 with respect to the imbedded insert 56, which it has not been possible to do heretofore.

Fig. 23 illustrates in detail the mold construction required for the purpose of molding a large piece. In this case, again, such body might be a part for the household or might be a large mechanical part, but, specifically, I indicate the molding of a toilet seat which may contain a central core or which may be made without an imbedded core member. Because of the large size, a multiplicity of pressure chambers C are provided, and these are arranged in such manner that the outlets 13 feed as directly as possible into cavity 15. Pressure equalization takes place due to the interconnection of outlets 13 at the point of junction with mold cavity 15. The imbedded insert is indicated at 56 and the chaplet and support which is preferably made of a similar grade of synthetic resinous material is indicated at 65. This chaplet can be of any shape and preferably is used in the form of a compressed tablet and will, upon being enveloped in the material issuing through pressure chamber outlet 13, assume the same density and will be unrecognizable in the finished part of the toilet seat when removed from mold cavity 15. Overflow channels are indicated at 29. An insert for the hinged portion requires the use of no loose mold section as would ordinarily be required and is indicated at 64. If it is desirable to imbed this insert for the hinged portion as indicated at 64 in a synthetic resinous material, this can readily be done by so designing mold cavity 15. I am thus enabled to use strong shock resistant materials which may be either of wood flour or of cut up or shredded canvas or paper and provide a lasting and enduring bath room accessory, which heretofore has not been a commercial possibility. It is to be understood that the great strength of the molded parts made from the shredded or cut up long fibred materials often make it possible to utilize a hollowed out core member or insert in place of the solid insert 56, thus considerably cheapening the product.

Fig. 24 indicates the method of molding sheet-like bodies similar to the usual laminated material, as, for example, that known in the trade as Micarta. In this figure the upper mold portion is indicated at 14, the lower mold portion at 18, and the conventionally shown heating arrangements at 16 and 20. The pressure chambers are indicated at C, the outlets at 13 emptying into feeder channels 26, and preferably provided with an undercut or roughened portion as at 27. The overflow channels are indicated at 29 and are in cooperative relation with the closed mold cavity 15 forming the finished part 25, which may be either a laminated or layer-like body, or which may merely be a sheetlike body formed of cut up or shredded long fibred fillers including synthetic resinous materials such as, for example, fi rs of cloth, paper, or for that matter other fibres such as jute, hemp, sisal, bagasse fibre, etc. The mold parting line for the balancing of pressures is indicated at several points as the outward pressure must be reckoned with at these several points and is indicated as 19. The mold aligning pins are indicated at 23. Suitable surface plates which may be highly polished or which may be suitably grained are indicated at 66 and these surface plates may either be cut short or drilled to allow the passage of material feeding through pressure chamber outlet 13 in order that the gate of synthetic resinous material formed in outlet 13 may be delivered through feeder channels 26 with as little friction as possible into mold cavity 15. It will be noted that these feeder channels are arranged coincidentally with the narrow edges of mold cavity 15, providing thereby a supply of resinous material between the layers of paper or cloth of any desired pressure. These layers of paper, cloth, etc. are placed in mold cavity 15, whereby the material issuing from pressure chamber C will be uniformly and equally distributed between the laminations of such sheetlike material. By this method of operation it is possible for me to mold and laminate at any desired pressure and use either previously impregnated paper or cloth or just open unimpregnated materials prior to being placed in mold cavity 15. It will be noted that mold cavity 15 is entirely closed due to the chase of mold indicated at 35 kept in position with respect to the other cooperating mechanism by means of mold aligning pins 23.

In Fig. 25 I show another mold arrangement suitable for the same general purposes. As the numbers agree with the numbers used in Fig. 24 and also agree with the designations used in the other figures previously shown, no detailed explanation is necessary. The particular object here is to provide a light portable mold portion consisting of plates 66 and frame 35 which may be readily removed from and replaced with another such mold portion and brought into proper coincidence by reason of bottom pins 23 with the upper half of mold 14 and lower half of mold 18, which in turn remain as a permanent part of the press equipment and provide the pressure cavities properly spaced.

While I have herein shown and described certain preferred embodiments of my invention, I wish it to be understood that I do not limit myself to all the precise details of construction set forth by way of illustration, as modification and variation may be made without departing from the spirit of the invention or exceeding the scope of the appended claims.

What I claim is:—

1. An apparatus for the forming of molded articles comprising a suitable pressure device providing relatively high unit pressures and communicating with a separable mold cavity normally closed as to mold cavity dimensions, a main operating ram for said pressure device, and a constant pressure ram assembly for closing the mold cavity in opposition to the movement of the main operating ram, the closing force being so proportioned that hydrostatic pressures within the mold cavity are maintained below a certain safe maximum unit pressure by permitting the mold cavity to momentarily open and quickly close to allow excess material to escape whereby pressure is reduced.

2. An apparatus for the forming of molded articles comprising a suitable press provided with a pressure chamber assembly having a cavity and a plunger both terminating in mating tapering ends, and a discharge orifice which tapers toward the pressure chamber, the chamber and orifice meeting at the point of smallest diameter.

3. An apparatus for the forming of molded articles comprising a suitable press supporting a pressure chamber provided with an outlet for forcing a molding material under very high pressure in a free flowing condition into a mold cavity, said mold cavity consisting of a fragile or relatively weak interior body portion reinforced by a chase of relatively strong supporting material extending around the periphery of the body portion, and means to relieve the pressure in the mold cavity at a pressure substantially lower than the aforesaid high pressure.

4. An apparatus for the forming of synthetic resinous articles comprising a suitable press supporting a pressure chamber assembly capable of forcing a synthetic resinous material under very high pressure in a free flowing condition into a mold cavity, said mold cavity being formed of a cementitious material faced with a separating layer, and means so designed as to retain only a sufficient amount of material at a maximum pressure substantially lower than the aforesaid high pressure and to reject excess material, whereby pressure in the mold cavity is reduced within safe operating limits.

5. The herein described method of molding a synthetic resinous article which includes placing synthetic resinous material in a pressure chamber, subjecting said material therein to a relatively high unit pressure suitable to cause the material to flow into and fill a communicating mold cavity closed as to the dimensions of the article to be formed therein, forming the article in the mold cavity by subjecting the material thereof to the action of heat and a unit pressure which is substantial but which at no time exceeds a reduced pressure suitable for molding the article, said molding pressure being substantially less than the highest unit pressure applied on the material in the pressure chamber, the desired relief of excess pressure being obtained in the mold cavity even when filled by causing discharge of excess material from the mold cavity, and thereby causing complete emptying of the pressure chamber cavity at each stroke.

6. The herein described method of molding a synthetic resinous article which includes placing a measured charge of synthetic resinous material in a pressure chamber, subjecting said material therein to a relatively high unit pressure suitable to cause the entire charge of material to flow out of the pressure chamber and into a communicating mold cavity closed as to the dimensions of the article to be formed therein, but higher than is desired for molding, momentarily opening the mold cavity when the pressure applied to the material therein rises higher than a desired molding pressure substantially less than the highest unit pressure applied to the material in the pressure chamber, and thereby causing discharge of excess material from the mold cavity and complete emptying of the pressure chamber, and forming the article in the mold cavity under the influence of heat and a pressure which is substantial but which never exceeds the desired molding pressure.

7. The herein described method of molding a synthetic resinous article which includes placing synthetic resinous material in a pressure chamber, subjecting said material therein to a relatively high unit pressure suitable for constricting and causing the material to flow into and fill a communicating mold cavity closed as to the dimensions of the article to be formed therein, momentarily opening the mold cavity when the pressure applied to the material therein rises higher than a desired molding pressure substantially less than the highest unit pressure applied to the material in the pressure chamber, thereby simultaneously affording escape of the excess material from the mold cavity and emptying of the pressure chamber, quickly closing the mold cavity and simultaneously sharply cutting off the excess material as the mold cavity is closed, and forming the article in the mold cavity under the influence of heat and a pressure never exceeding the desired molding pressure.

8. The herein described method of molding a synthetic resinous article which includes placing synthetic resinous material in a pressure chamber, subjecting said material therein to a relatively high unit pressure substantially greater than 5000 pounds to the square inch and suitable to cause the material to flow into and fill a communicating mold cavity closed as to the dimensions of the article to be formed therein, forming the article in the mold cavity by subjecting the material thereof to the action of heat and a unit pressure at no time exceeding a reduced pressure suitable for molding the article, said molding pressure being substantially less than the highest unit pressure applied on the material in the pressure chamber, the desired relief of excess pressure being obtained by permitting excess material to discharge from the mold cavity when filled, and thereby completely emptying the pressure chamber cavity at each stroke.

9. The herein described method of molding a synthetic resinous article which includes placing synthetic resinous material in a pressure chamber, subjecting said material therein to a relatively high unit pressure of not less than 5000 pounds to the square inch suitable to cause the material to flow into and fill a communicating mold cavity closed as to the dimensions of the article to be formed therein, momentarily opening the mold cavity when the pressure applied to the material therein rises higher than a desired molding pressure substantially less than the highest unit pressure applied to the material in the pressure chamber, thereby simultaneously affording escape of the excess material from the mold cavity and emptying of the pressure chamber, quickly closing the mold cavity to cut off the excess material, and forming the article in the mold cavity under the influence of heat and a pressure never exceeding the desired molding pressure.

10. An apparatus for the forming of molded articles comprising a press, a pressure chamber assembly thereon so constructed as to provide super-hydraulic unit pressure, a separable mold assembly in flow communication therewith constructed and arranged to operate at a relatively low unit pressure, and means holding said mold assembly closed but yieldable for automatically limiting the pressure in the mold transmitted thereto from the pressure chamber to the said relatively low unit pressure.

11. An apparatus for the molding and forming of synthetic resinous articles comprising a suitable press supporting a small pressure chamber assembly for receiving a single charge of material and for exerting super-hydraulic unit pressure thereon, said press also supporting a separable mold assembly in flow communication with the pressure chamber and so constructed and arranged as to operate at a substantial but relatively lower unit pressure, the pressure chamber and mold cavity being connected by a divergent outlet, and yieldable means normally closing the separable mold but yieldable to afford opening of the mold for automatically preventing the transmission of the extremely high pressure of the chamber to the mold while forming the synthetic resinous article, and for causing escape of excess material from the mold and complete emptying of the pressure chamber, means to heat the mold in order to react and set the material under heat and pressure, and means to remove the molded piece from the mold, the material in the divergent outlet being removed with the molded piece.

12. An apparatus for the molding and forming of articles comprising a suitable pressure device supporting a pressure chamber assembly providing a relatively high unit pressure, said pressure device also supporting a mold assembly defining a mold cavity and designed and constructed to operate at a lower unit pressure, said mold cavity being closed as to the dimensions of the article to be formed therein while being filled with molding material, a feeder channel connecting the mold cavity with the pressure chamber, and means affording automatic opening of said mold assembly to reject excess material when the unit pressure within the mold cavity at the mold parting line exceeds the aforesaid low pressure at which the mold is intended to operate.

13. An apparatus for the forming of molded articles comprising a suitable hydraulic press supporting a pressure chamber, a ram of relatively small area fastened to the head of the press and providing relatively high pressures within the pressure chamber cavity, a progressively widening orifice and feeder channel connecting the chamber and a dimensionally closed but separable mold cavity to quickly fill the same, and mechanism normally closing the mold parts but causing the same to open when the hydrostatic pressure of the main ram exceeds a relatively low desired molding pressure, whereby the mold cavity is momentarily opened to allow excess material to escape and then quickly closed, so that the pressure is reduced to a safe operating limit.

14. An apparatus for the forming of articles comprising a hydraulic press, a pressure chamber assembly providing relatively high unit extrusion pressures, a mold assembly in flow communication therewith, said pressure chamber being provided with a ram of small area in order to force the molding material into the dimensionally closed mold cavity under high pressure to quickly fill the same, and means including opposed rams for maintaining the mold assembly closed but free to automatically open when the hydrostatic pressure exceeds a predetermined desired molding pressure substantially less than the aforesaid high unit extrusion pressures.

15. An apparatus for the forming of molded articles comprising a suitable press supporting a pressure chamber assembly providing relatively high unit pressures, a mold assembly defining a cavity designed and constructed to withstand substantially lower unit pressures and provided with an adjacent overflow channel arrangement for receiving excess material discharged therein when the mold cavity is opened, said overflow channel being substantially closed from said mold cavity when the mold assembly is closed, means connecting the pressure chamber and the mold cavity, and means affording momentary opening of said mold cavity when the pressure transmitted by the material from the pressure chamber to the mold cavity exceeds the aforesaid lower unit pressure.

16. An apparatus for the forming of synthetic resinous articles comprising a suitable press supporting a small pressure chamber assembly for receiving a single charge of the material and for exerting relatively high unit pressures thereon, a mold assembly defining a cavity designed and constructed to withstand substantially lower unit pressures and provided with an adjacent overflow channel arrangement for receiving excess material discharged therein when the mold cavity is opened, said overflow channel being substantially closed from said mold cavity when the mold assembly is closed, means between said cavity and overflow channel sharply defining said cavity and adapted to cut the excess synthetic resinous material free from the synthetic resinous material in the overflow channel, means connecting the pressure chamber and the mold cavity, and means affording momentary opening of the mold cavity and discharge of material from the mold cavity into the channel when the pressure in the cavity exceeds the aforesaid low unit pressure.

17. An apparatus for the forming of synthetic resinous articles comprising a press, a separable mold assembly constructed for relatively low pressure operation and mounted in said press, a plurality of small-diameter pressure chambers mounted in said press and communicating with the mold cavity, a plurality of mating rams for said pressure chambers, said pressure chambers forcing contained synthetic resin to flow into the mold cavity under extremely high unit pressures, the parting face area of the mold being much larger than the total cross-sectional area of the rams, and means holding said mold assembly closed but yieldable to limit the maximum pressure in the mold cavity to the desired operating value substantially lower than the pressure developed in the pressure chambers.

18. An apparatus for the forming of synthetic resinous articles comprising a press, a small generally cylindrical pressure chamber assembly for receiving a single charge of molding material, said chamber having one end inwardly tapered in the direction of a relatively small pressure chamber outlet, and a pressure plunger reciprocable in said chamber and having its end tapered to mate with the tapered end of the cylinder, said plunger and chamber being so constructed as to provide a high unit transfer pressure when operated by the press, a separable mold assembly in communication with the pressure chamber by means of the aforesaid outlet, the mold cavity being smaller than the charge of molten material, means to heat the mold assembly, and means yieldably holding said mold assembly closed and affording escape of excess material from the mold when the pressure exceeds a desired molding pressure which is substantial but lower than the transfer pressure, so that the chamber is fully emptied at each stroke.

19. An apparatus for the forming of permanently infusibly thermosetting synthetic resinous articles comprising a suitable press supporting a pressure chamber assembly, said pressure chamber being provided with an operating cavity in which synthetic resinous material is heated and caused to flow through a divergent outlet into a mold arrangement provided with an undercut portion closely adjacent to the gate of synthetic resinous material formed in the pressure chamber outlet, whereby the undercut or roughened portion assists in removing said gate from said outlet when mold members are opened, thus clearing the outlet for the next molding operation.

20. An apparatus for the forming of permanently infusibly thermosetting synthetic resinous articles comprising a suitable press supporting a pressure chamber designed to force a synthetic resinous material under very high pressure in a free flowing condition into a separable mold cavity formed of a relatively weak material thinly faced or coated with a separating film such as cellulose acetate, said mold member being strengthened by means of a chase or armor of relatively strong material such as steel extending around the periphery of the body portion, and means holding said mold cavity closed but yieldable to relieve the pressure in the mold cavity at a pressure substantially lower than the aforesaid high pressure.

21. An apparatus for the forming of molded articles comprising a hydraulic press of large capacity, a cylindrical pressure chamber of small diameter mounted therein, a ram of small diameter mating with said pressure chamber for forcing the molding material from the pressure chamber under extremely high unit pressures upon operation of the press, said ram having a sealing groove extending peripherally around the same, said groove being initially open and devoid of any piston ring or like mechanism, the material in the pressure chamber being sealed against leakage around the ram by a filling of the material which is constantly built up in the groove during operation of the apparatus.

22. The herein described method of molding a permanently infusibly thermosetting synthetic resinous article which includes placing a measured single charge of said material in a pressure chamber communicating with a mold cavity, said charge being larger than the volumetric capacity of the mold cavity, subjecting said material in the pressure chamber to a relatively high unit pressure suitable to force the entire charge of material out of the pressure chamber to the mold, and forming the article in the mold cavity by subjecting the material therein to the action of heat and a unit pressure which is substantial but which at no time exceeds a reduced pressure suitable for molding the article, and momentarily opening the mold cavity whenever the pressure therein exceeds the aforesaid desirable molding pressure, said desirable molding pressure being substantially less than the highest unit pressure applied on the material in the pressure chamber and thereby insuring emptying of the pressure chamber.

23. The herein described method of molding an article which includes placing a measured charge of molding material in a pressure chamber communicating with a mold cavity, said charge being larger than the volumetric capacity of the mold cavity, subjecting said material in the pressure chamber to a relatively high unit pressure suitable to force the entire charge of material out of the pressure chamber to the mold, forming the article in the mold cavity by subjecting the material therein to a unit pressure at no time exceeding a reduced pressure suitable for molding the article, and momentarily opening the mold cavity whenever the pressure therein exceeds the aforesaid desirable molding pressure, said molding pressure being substantial but substantially less than the highest unit pressure applied to the material in the pressure chamber.

24. The herein described method of molding a permanently infusibly thermosetting synthetic resinous article which includes placing a measured charge of said material in a pressure chamber communicating with a mold cavity, said charge being larger than the volumetric capacity of the mold cavity, subjecting said material therein to a relatively high unit pressure of not less than 5000 pounds to the square inch suitable to force the entire charge of material out of the pressure chamber to the mold, forming the article in the mold cavity by subjecting the material therein to the action of heat and a suitable molding pressure which is substantial but at all times substantially lower than 5000 pounds to the square inch, and momentarily opening the mold cavity whenever the pressure therein exceeds said desirable molding pressure.

25. The herein described method of molding a strong, shock-resistant molded article out of long-fibred cellulosic materials in matted or shredded form, and a binder therefor, which includes mixing and placing a measured charge of the materials for such compound in a very strong pressure chamber having a constricted outlet communicating with a mold cavity, said charge being larger than the volumetric capacity of the mold cavity, subjecting the materials in the pressure chamber to heat and a very high unit pressure suitable for fully extruding even the aforesaid mixture of materials through the outlet in a thin plastic stream, whereby the long fibres are suitably mixed, impregnated, and covered with the binder used, and the stream of material flows to the mold cavity, but preventing the mold pressure from building up to the high extrusion pressure by momentarily opening the mold cavity and thereby causing discharge of excess material from the mold cavity, and forming the article in the mold cavity under a suitable molding pressure which is substantial but at all times substantially less than the aforesaid high extrusion pressure.

26. The herein described method of molding an article which includes compressing and completely extruding a measured charge of molding material in a constricted stream at a relatively high velocity and under a very high unit pressure best suited for extrusion, toward a mold defining a mold cavity which is smaller in volume than the aforesaid charge of material, widening the stream and thereby decreasing the velocity and frictional resistance and pressure of the stream in the direction of flow toward and into said mold cavity, whereby said mold cavity quickly receives the entire charge of synthetic resinous material, and momentarily opening the mold cavity and thereby causing discharge of excess material from the mold in order to limit the molding pressure within the mold cavity to a desired maximum which is substantial but at all times substantially less than the aforesaid high unit extrusion pressure.

27. The herein described method of molding an article which includes placing a core of suitable material in a mold cavity and spacing out said core member through the use of suitably shaped pieces of molding material, placing a main charge of molding material in a separate pressure chamber in flow communication with the mold cavity, said charge being larger than the unoccupied volume of the mold cavity, compressing and extruding the entire charge of molding material in plastic condition from the pressure chamber into said mold cavity under a very high unit pressure suitable for extrusion but too high for molding, and throughout the molding operation limiting the pressure within said mold cavity to a desired molding pressure which is substantial but substantially lower than the aforesaid high unit pressure in the pressure chamber, by momentarily opening the mold cavity and thereby causing discharge of excess material from the mold, when the mold pressure becomes excessive.

28. An apparatus for the forming of molded articles comprising a press, a separable mold assembly supported therein, a small-diameter pressure chamber communicating with said mold assembly for receiving a measured single charge of the synthetic resinous material and for providing a very high unit transfer pressure for forcing said material completely from the pressure chamber into the mold cavity, means to heat the pressure chamber and mold, said mold cavity being normally closed as to dimensions and designed and constructed to operate at a pressure which is substantial in order to help react and set the resin but which is substantially lower than the high transfer pressure, yieldable means on said press for closing said separable mold assembly but yieldable to afford opening of the mold cavity and partial relief of pressure therein when the pressure grows to a value higher than that at which the mold cavity is to be operated, and an overflow channel for receiving excess synthetic resinous material from said mold cavity.

29. Molding apparatus comprising a large-capacity press supporting a pressure chamber assembly and a mold assembly, said pressure chamber assembly including a small pressure chamber for receiving a single charge of molding material, and a small-diameter plunger cooperating therewith for exerting extremely high pressure on the molding material, the inner end of said cavity being closed except for a small discharge outlet leading into the mold assembly, said mold assembly being designed to operate at a pressure which is substantial but substantially lower than the extrusion pressure, means holding said mold assembly closed but yieldable to afford opening and dicharge of excess material in order to limit the molding pressure and in order to obtain complete emptying of the charge in the pressure chamber at each stroke of the plunger, and external stroke limiting stops on said press so dimensioned and located that the force of the press applied to the plunger will not injure the closed end of the pressure chamber cavity while causing complete emptying of said chamber.

30. Molding apparatus comprising a large-capacity press supporting a pressure chamber assembly and a mold assembly, said pressure chamber assembly including a small pressure chamber for receiving a single charge of molding material, and a small-diameter plunger cooperating therewith for exerting extremely high pressure on the molding material, said plunger being completely retractable at each stroke to permit loading of the chamber, the inner end of said cavity being closed except for a small discharge outlet leading into the mold assembly, said mold assembly being designed to operate at a pressure which is substantial but substantially lower than the extrusion pressure, means holding said mold assembly closed but yieldable to afford opening and discharge of excess material in order to limit the molding pressure and in order to obtain complete emptying of the charge in the pressure chamber at each stroke of the plunger, said small-diameter plunger being supported upon a heated bed plate of relatively large area, whereby a relatively high unit pressure is distributed over a wide area on the head of the press and accurate rigid support as well as simultaneous heating of the small-diameter plunger are provided, and heat insulation means interposed between the heated bed plate and the head of the press.

31. Molding apparatus comprising a large-capacity press having fixed top and bottom heads, a main ram passing through the bottom head, a bottom platen mounted on said ram, auxiliary opposed rams, a top platen mounted on said opposed rams, mating separable top and bottom mold portions mounted on said top and bottom platens, a small-diameter pressure chamber mounted on said top platen and communicating with the mold cavity by a constricted outlet, a mating small-diameter plunger fixedly mounted on the top head of the press for forcing molding material from the pressure chamber at extremely high pressure after the mold cavity is closed during upward movement of the main ram, the resistance of the opposed rams being so related to the parting face area of the mold as to cause momentary opening of the mold and escape of excess material when the mold pressure exceeds a desired value substantially less than the high extrusion pressure.

32. Molding apparatus comprising a large-capacity press having fixed top and bottom heads, a main ram passing through the bottom head, a bottom platen mounted on said ram, auxiliary opposed rams, a top platen mounted on said opposed rams, mating separable top and bottom mold portions mounted on said top and bottom platens, a small-diameter pressure chamber mounted on said top platen and communicating with the mold cavity by a constricted outlet, a mating small-diameter plunger fixedly mounted on the top head of the press for forcing molding material from the pressure chamber at extremely high pressure after the mold cavity is closed during upward movement of the main ram, the parting face area of the mold being far greater than the cross-sectional area of the plunger, the resistance of the opposed rams being so related to the parting face area of the mold as to cause momentary opening of the mold and escape of excess material when the mold pressure exceeds a desired value substantially less than the high extrusion pressure.

33. Molding apparatus comprising a large-capacity press having fixed top and bottom heads, a main hydrostatically operated ram passing through the bottom head to an operating cylinder located beneath said head, a bottom platen mounted on said ram, auxiliary opposed hydrostatically operated rams passing through the top head to cylinders mounted above said top head, a top platen mounted on said opposed rams, mating separable top and bottom mold portions mounted on said top and bottom platens, a small-diameter pressure chamber mounted on said top platen and communicating with the mold thereneath by a constricted diverging outlet, a mating small-diameter plunger fixedly mounted on the top head of the press for forcing molding material from the pressure chamber at extremely high pressure after the mold cavity is closed during upward movement of the main ram, and means to heat the plunger, pressure chamber, and mold, the resistance of the opposed rams being so related to the parting face area of the mold as to cause momentary opening of the mold and escape of excess material when the mold pressure exceeds a desired value substantially less than the high extrusion pressure, and to produce complete emptying of the pressure chamber at each stroke of the press.

34. An apparatus for molding automobile steering wheels, said apparatus comprising a press, a separable mold assembly mounted in said press and arranged to operate at a relatively low unit pressure, a plurality of small-diameter pressure chambers distributed over said steering wheel mold and so constructed as to provide super-hydraulic unit pressure, and means holding said mold assembly closed but yieldable to permit opening of the mold for automatically limiting the maximum pressure in the mold cavity to the said relatively low unit pressure.

35. An apparatus for molding automobile steering wheels, said apparatus comprising a plurality of pressure chambers providing relatively high transfer pressures and communicating at spaced points with a separable mold cavity normally closed to the desired dimensions for the steering wheel, a main operating ram for simultaneously emptying said pressure chambers, and a constant pressure ram assembly for yieldably closing the mold cavity in opposition to the movement of the main operating ram, the closing force being so proportioned that pressure within the mold cavity is maintained below a desired maximum molding pressure substantially less than the transfer pressure by permitting the mold cavity to momentarily open to allow excess material to escape.

EMIL E. NOVOTNY.